United States Patent [19]

Hakarine

[11] 4,042,762
[45] Aug. 16, 1977

[54] HANDLE FOR PLASTIC BATTERIES

[75] Inventor: Duane D. Hakarine, Minneapolis, Minn.

[73] Assignee: Gould Inc., Rolling Meadows, Ill.

[21] Appl. No.: 630,804

[22] Filed: Nov. 11, 1975

Related U.S. Application Data

[63] Continuation of Ser. No. 549,153, Feb. 12, 1975, abandoned.

[51] Int. Cl.² .............................................. H01M 2/02
[52] U.S. Cl. .................................................. 429/187
[58] Field of Search ........................ 136/181, 166, 170; 220/94 A; 429/187

[56] References Cited

U.S. PATENT DOCUMENTS 3,884,384   5/1975   Cloyd ................................ 220/94 A
3,910,800   10/1975  Crosby .............................. 136/170

FOREIGN PATENT DOCUMENTS 2,233,719   10/1975  France ............................... 136/166

Primary Examiner—John H. Mack
Assistant Examiner—H. A. Feeley
Attorney, Agent, or Firm—Leydig, Voit, Osann, Mayer & Holt, Ltd.

[57] ABSTRACT

Straps are molded integrally with and hinged to opposite sides of a plastic battery case and may be swung upwardly to form a handle for enabling easy carrying of the battery. In one embodiment, the straps are formed with hand holes and are grabbed individually when the battery is carried. In another embodiment, the straps are secured together at their ends and define a bail-type handle for the battery.

4 Claims, 4 Drawing Figures

U.S. Patent
Aug. 16, 1977
4,042,762
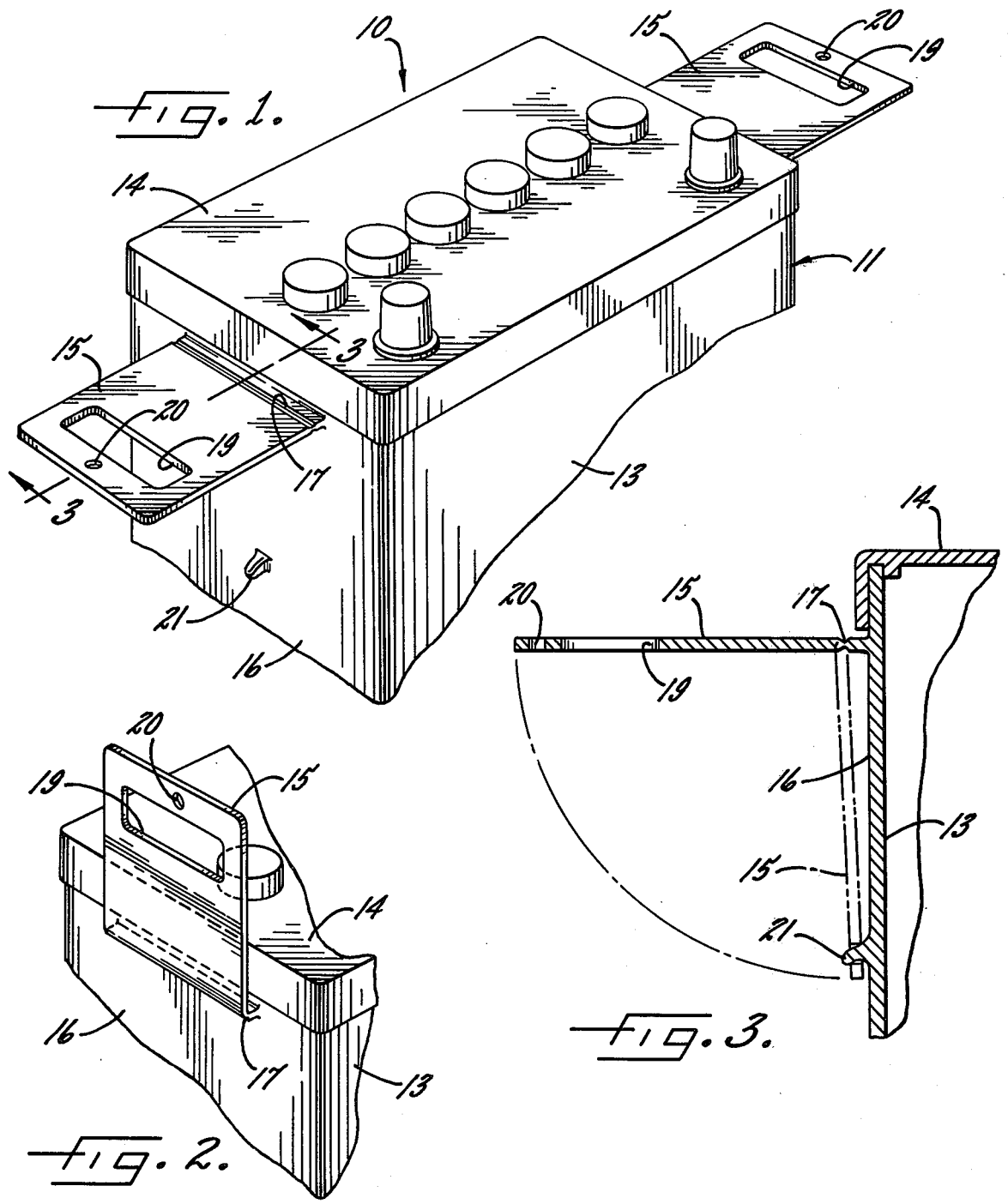
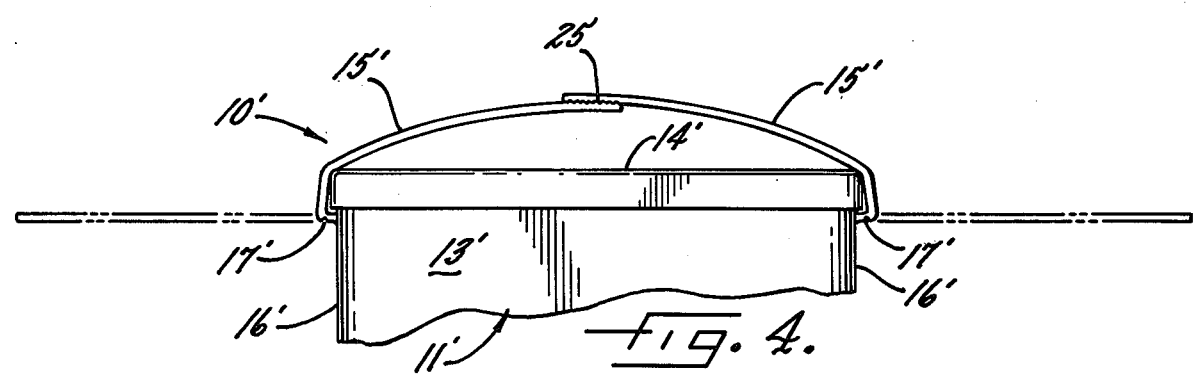

HANDLE FOR PLASTIC BATTERIES

This is a continuation of application Ser. No. 549,153, filed Feb. 12, 1975, now abandoned.

This invention relates generally to an electrical storage battery and, more particularly, to a battery having a box-like case which is molded of plastic.

To facilitate lifting and carrying of such a battery, it has been proposed to provide the battery with a permanent handle. Presently available handles, however, are difficult to attach to the plastic case and thus significantly increase the overall cost of manufacturing the battery.

Accordingly, it is the general aim of the present invention to provide a storage battery having an improved handle which may be formed as an integral part of the battery case so as to eliminate the need of attaching the handle to the case and thus reduce the cost of equipping the battery with a handle.

A more detailed object is to provide a battery having a handle defined by straps which are integrally hinged to the case and which may be folded into positions enabling easy carrying of the battery.

The invention also resides in the construction of the straps and the integral hinges whereby, in one embodiment of the invention, the straps may be folded to and retained in and out of the way storage position and, in another embodiment, the straps may be joined together to form a bail-type handle for the battery.

Other objects and advantages of the invention will become apparent from the following detailed description and with reference to the accompanying drawings, in which:

FIG. 1 is a fragmentary perspective view of a battery equipped with one embodiment of a handle incorporating the novel features of the present invention;

FIG. 2 is a fragmentary perspective view of the battery and showing one of the handle straps in its carry position;

FIG. 3 is an enlarged fragmentary cross-section taken substantially along the line 3—3 of FIG. 1; and FIG. 4 is a fragmentary front elevation of a battery equipped with a modified embodiment of a handle incorporating the invention.

While the invention will be described in connection with preferred embodiments, it will be understood that I do not intend to limit the invention to those embodiments. On the contrary, I intend to cover all alternatives, modifications and equivalents as may be included within the spirit and scope of the invention as defined by the appended claims.

Turning now to FIG. 1, there is shown an electrical storage battery 10 of the type commonly used in automobiles. The battery includes a box-like case 11 and defined by a container 13 having a generally rectangular shape and by an overlying cover 14 which is sealed to the container.

According to the invention, straps 15 are molded integrally with opposite upright wall 16 of the case 11 and may be hinged upwardly to form a handle which facilitates carrying of the battery 10. By virtue of the straps being molded integrally with the case, the battery can be provided with a handle at very little cost because the handle is formed as an incident to formation of the case and need not be attached to the case in a separate assembly step.

In the embodiment of the invention shown in FIGS. 1 to 3, each strap 15 is molded integrally with the container 13 and is located just below the junction of the container and the cover 14. As initially molded, each strap projects horizontally from the container as shown in FIGS. 1 and 3. With the straps being molded in this position, the design of the molding dies is simplified and the dies may be easily closed and separated.

A hinge 17 is located adjacent the junction of the inner end of each strap 15 and the associated wall 16 of the container 13 in order to permit the straps to swing upwardly and downwardly from their horizontal positions. Each hinge is a so-called "living" hinge and is formed during the molding operation by thinning or grooving opposite walls of the strap along lines extending transversely of the strap at the inner end portion thereof. The hinges permit the straps to be swung upwardly to substantially vertical carrying positions (see FIG. 2) in which the straps may be grabbed to enable easy lifting and carrying of the battery. To facilitate such lifting and carrying, a hand hole 19 is formed through the outer end portion of each strap and is sufficient;y large to receive the fingers of an adult male.

The hinges 17 also permit the straps 15 to be swung downwardly alongside the walls 16 of the container 13 to an out of the way storage position as shown in phantom in FIG. 3. To hold the straps in the storage position, a retainer in the form of a small opening 20 is formed through the outer end portion of each strap and is adapted to interfit releasably with a coacting retainer in the form of a lug 21 which is molded integrally with and projects outwardly from the associated side of the container.

Consistent with the objectives of this invention, the box-like case and the integrally molded straps are formed from conventionally known polypropylene polymers and copolymers of propylene with other monomers such as, for example, ethylene. Suitable molecular weights and other characteristics required to provide the straps with the necessary hinge feature are well known. The cover may be formed from the same material as in the case or from any of the other materials known in the art.

Another embodiment of the invention is shown in FIG. 4 in which parts corresponding to those of the first embodiment are indicated by the same but primed reference numerals. In this instance, the straps 15' are formed integrally with and hinged to the walls 16' of the container 13' as indicated at 17' and are sufficiently long that the free ends of the straps are located adjacent one another when the straps are swung upwardly from their originally molded horizontal positions and are folded toward one another into overlying relation with the cover 14'. As a result, the free ends of the straps may be secured to one another to form a bail-type handle for the battery 10'. In the disclosed embodiment, the ends of the straps overlap one another and are secured together by thermal welding as indicated at 25. The ends may, however, be secured by conventionally known adhesives such as various epoxies, by rivets or other types of separate connectors, or by interlocking means formed as part of the straps themselves.

From the foregoing, it will be apparent that the present invention brings to the new art new and improved batteries 10 and 10' having handle-defining straps 15 and 15' which are formed as an incident to molding the battery cases 11 and 11'. Accordingly, the handles add very little to the overall cost of the batteries. While the straps have been shown as being joined to the containers 13 and 13', it will be appreciated that they could be molded integrally with the covers 14 and 14'.

I claim as my invention:

1. A storage battery having a box-like case made of plastic, straps molded integrally with opposite upright walls of said case and an integral hinge located adjacent the junction of the inner end of each strap and the associated wall of the case and supporting said strap for upward swinging to a position in which said strap may serve as a handle for facilitating carrying of the battery, each strap including a first retainer and a second retainer being molded integrally with the associated wall of said case, each hinge also permitting its associated strap to swing downwardly to a storage position alongside said case, and said retainers being sized to interfit with one another to releasably hold said straps in said storage position.

2. A storage battery as defined in claim 1 in which a hand hole is formed through the outer end portion of each strap, each hinge permitting its associated strap to swing upwardly to a carrying position in which the strap is disposed substantially vertically and in which said hand hole faces substantially horizontally.

3. A storage battery as defined in claim 1 in which said first retainer comprises an opening formed through said strap, said second retainer comprising an outwardly projecting lug molded integrally with said case and located to secure said strap when said strap is swung downwardly to said storage position.

4. A storage battery having a box-like case made of plastic, straps molded integrally with opposite upright walls of said case and an integral hinge located adjacent the junction of the inner end of each strap and the associated wall of the case and supporting said strap for upward swinging to a position in which said strap may serve as a handle for facilitating carrying of the battery, said hinges being constructed to permit said straps to be swung upwardly and then toward one another into overlying relation with the top of said case, said straps being of such length that the free end portions of the straps are located adjacent one another when the straps are in overlying relation with said case, and means securing the free end portions of said straps together whereby the straps define a bail-type handle.

* * * * *